(12) United States Patent
Chen

(10) Patent No.: US 7,631,292 B2
(45) Date of Patent: Dec. 8, 2009

(54) CODE INDIVIDUALISM AND EXECUTION PROTECTION

(75) Inventor: Yuqun Chen, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 541 days.

(21) Appl. No.: 10/701,972

(22) Filed: Nov. 5, 2003

(65) Prior Publication Data

US 2005/0097246 A1 May 5, 2005

(51) Int. Cl.
G06F 9/44 (2006.01)
G06F 9/45 (2006.01)
G06F 11/30 (2006.01)

(52) U.S. Cl. .............. 717/108; 717/106; 717/111; 717/159; 713/190; 713/194

(58) Field of Classification Search ......... 717/136–151, 717/111, 159; 726/22–33; 713/150–194
See application file for complete search history.

(56) References Cited

U.S. PATENT DOCUMENTS

| | | | | |
|---|---|---|---|---|
| 5,892,899 A | * | 4/1999 | Aucsmith et al. | 726/27 |
| 5,949,973 A | * | 9/1999 | Yarom | 726/23 |
| 6,061,449 A | * | 5/2000 | Candelore et al. | 380/28 |
| 6,405,316 B1 | * | 6/2002 | Krishnan et al. | 713/190 |
| 6,668,325 B1 | * | 12/2003 | Collberg et al. | 713/194 |
| 6,880,149 B2 | * | 4/2005 | Cronce | 717/126 |
| 7,051,200 B1 | * | 5/2006 | Manferdelli et al. | 713/153 |
| 7,080,257 B1 | * | 7/2006 | Jakubowski et al. | 713/187 |
| 7,124,445 B2 | * | 10/2006 | Cronce et al. | 726/26 |
| 7,188,241 B2 | * | 3/2007 | Cronce et al. | 713/155 |
| 2002/0144141 A1 | * | 10/2002 | Edwards et al. | 713/200 |
| 2003/0014667 A1 | * | 1/2003 | Kolichtchak | 713/201 |
| 2003/0093685 A1 | * | 5/2003 | Tobin | 713/200 |
| 2003/0120949 A1 | * | 6/2003 | Redlich et al. | 713/200 |
| 2003/0177391 A1 | * | 9/2003 | Ofek et al. | 713/201 |
| 2003/0188231 A1 | * | 10/2003 | Cronce | 714/52 |
| 2003/0217277 A1 | * | 11/2003 | Narayanan | 713/187 |
| 2003/0236986 A1 | * | 12/2003 | Cronce et al. | 713/189 |
| 2004/0003264 A1 | * | 1/2004 | Zeman et al. | 713/190 |
| 2004/0268322 A1 | * | 12/2004 | Chow et al. | 717/136 |
| 2005/0022172 A1 | * | 1/2005 | Howard | 717/136 |
| 2005/0071652 A1 | * | 3/2005 | de Jong | 713/189 |
| 2005/0071653 A1 | * | 3/2005 | de Jong | 713/189 |
| 2005/0071655 A1 | * | 3/2005 | de Jong | 713/190 |
| 2005/0084110 A1 | * | 4/2005 | Palmer | 380/268 |
| 2005/0138110 A1 | * | 6/2005 | Redlich et al. | 709/201 |
| 2005/0183072 A1 | * | 8/2005 | Horning et al. | 717/140 |
| 2005/0204348 A1 | * | 9/2005 | Horning et al. | 717/140 |
| 2005/0210275 A1 | * | 9/2005 | Homing et al. | 713/190 |
| 2006/0026430 A1 | * | 2/2006 | Luo | 713/176 |
| 2006/0031686 A1 | * | 2/2006 | Atallah et al. | 713/190 |
| 2006/0271921 A1 | * | 11/2006 | Cronce et al. | 717/151 |

OTHER PUBLICATIONS

Bhatkar et al., "Address Obfuscation: An Efficient Approach to Combat a Broad Range of Memory Error Exploits", In Proceedings of the 12th USENIX Security Symposium, Aug. 2003.*

(Continued)

*Primary Examiner*—Insun Kang
(74) *Attorney, Agent, or Firm*—Lee & Hayes, PLLC

(57) ABSTRACT

An intrusion-resistant mechanism based on restricted code segments and code individualization is able to thwart significant amounts of known and unknown low-level attacks that inject invalid code, in the form of false data or instructions for execution by a victim application, by varying the locations of code-containing segments within a memory space corresponding to an application.

24 Claims, 6 Drawing Sheets

OTHER PUBLICATIONS

Keromytis et al., "Countering Code-Injection Attacks with Instruction-Set Randomization", In Proceedings of the 10th ACM Conference on Computer and Communication Security, Oct. 2003.*

Cowan et al., "StackGuard: Automatic Detection and Prevention of Buffer-overrun Attacks", In Proceedings of the 7th USENIX Security Symposium, Jan. 1998.*

* cited by examiner

CODE INDIVIDUALISM AND EXECUTION PROTECTION

FIELD

This invention relates to thwarting low-level attacks, particularly buffer overruns, on software applications.

BACKGROUND

Attacks in the forms of, e.g., viruses and worms, are among the most prominent security concerns for software developers. Software, including operating systems and applications, both singularly and in combination, are vulnerable to attacks primarily due to programming errors. These attacks, also referred to as security breaches, on operating systems and/or applications typically fall into one of the three categories: low-level attacks, semantic-level attacks, and configuration-error attacks.

The first step towards breach-proof software is bug-free programming. However, a pragmatic perspective on the increasingly demanding task of programming leads to the realization that programming bugs are inevitable as applications continue to increase in sophistication. Static-analysis tools have proven effective for catching a large number of programming bugs that fit known patterns, but they still leave the programs vulnerable to more complex forms of attack. Further, the use of safe programming languages such as C# eliminates some classes of low-level vulnerabilities such as a buffer-overrun vulnerability, but performance is sacrificed by using such languages. That is, such languages are not conducive to more sophisticated forms of programming. Furthermore, parts of the run-time system and the just-in-time compiler, written in traditional C/C++ languages, still contain bugs.

Previous efforts at eliminating security breaches on software include run-time defense mechanisms. For example, bounds checkers can detect and stop buffer-overrun intrusions, but they require significant performance overhead. In addition, systems such as StackGuard and Microsoft® .NET® C/C++ compiler can transform a program to effectively catch buffer overruns on a stack. However, these systems are unable to catch buffer overruns in a heap, and their effectiveness against future, yet-to-be-invented attacks, is dubious. Further still, system-level techniques intending to prevent direct execution of injected malicious, or invalid, code are unable to stop indirect execution of the injected code via carefully-crafted buffer overruns.

SUMMARY

Methods for thwarting low-level attacks, particularly buffer overruns, are described herein.

Such methods include taking an inventory of software code components for an operating system or an application, defining segments for at least one of the code components corresponding to the application, dispersing the at least one code component in various segments, and randomly dispersing the location of the one or more code-containing segments.

BRIEF DESCRIPTION OF THE DRAWINGS

The scope of the present invention will be apparent from the following detailed description, when taken in conjunction with the accompanying drawings. The drawings, while indicating embodiments of the invention, are illustrative only, since various changes and modifications will become apparent to those skilled in the art from the following detailed description, in which.

DETAILED DESCRIPTION

Figure 1:
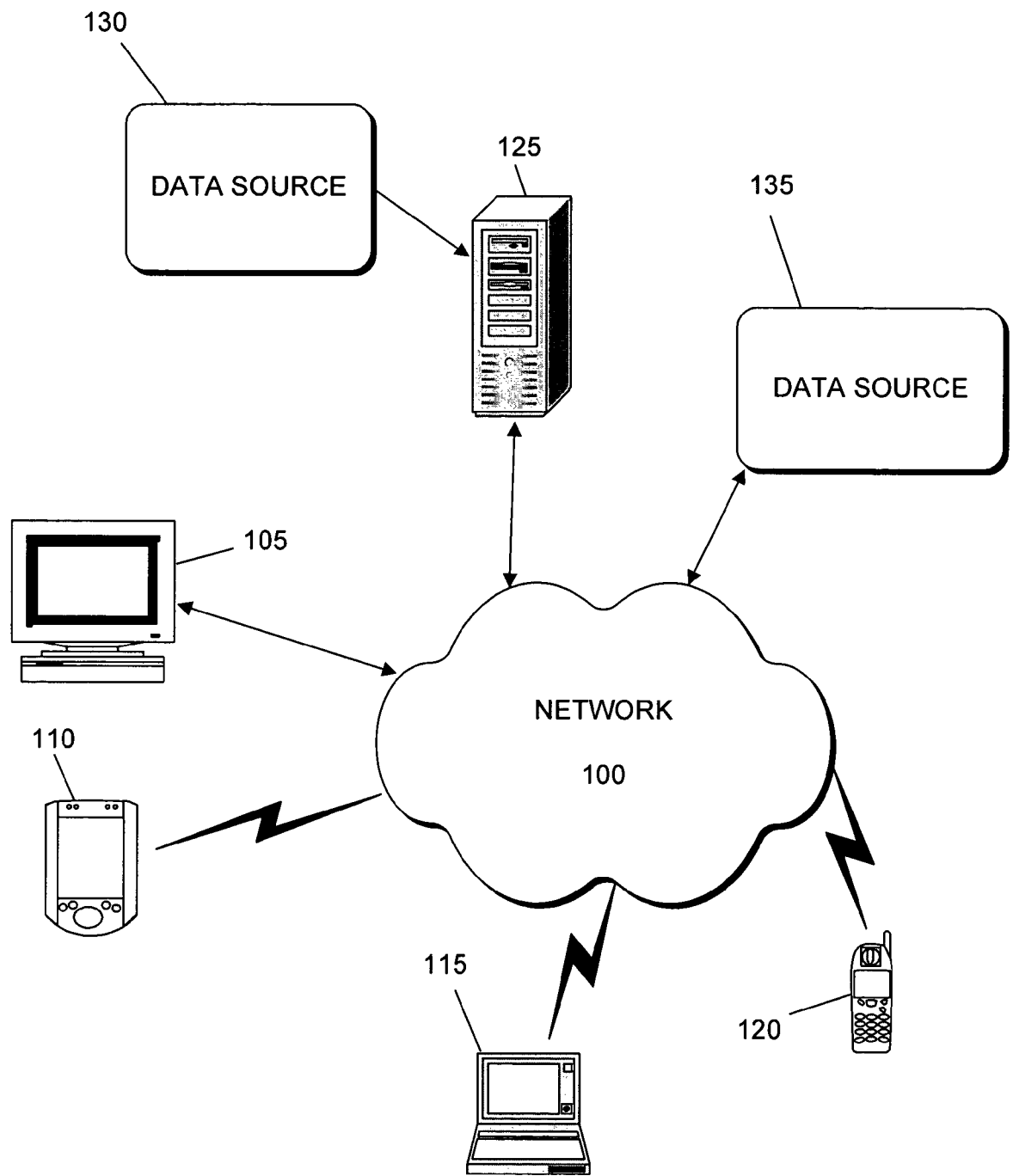
FIG. 1 shows a client/network system in accordance with example embodiments.

In the example network environment of FIG. 1, multiple client computing devices 105, 110, 115, and 120, also referred to as client devices, are coupled to at least one server device 125 via network 100. Network 100 is intended to represent any of a variety of conventional network topologies and types, which may include wired and/or wireless networks. Network 100 may further utilize any of a variety of conventional network protocols, including public and/or proprietary protocols. Network 100 may include, for example, the Internet as well as possibly at least portions of one or more local area networks (LANs).

Client device 105 may include any of a variety of conventional computing devices, including a desktop personal computer (PC), workstations, mainframe computers, Internet appliances, and gaming consoles. Further client devices associated with network 100 may include personal digital assistant (PDA) 110, laptop computer 115, and cellular telephone 120, etc., which may be in communication with network 100 by a wired and/or wireless link. Further still, one or more of client devices 105, 110, 115, and 120 may include the same types of devices, or alternatively different types of devices.

Server device 125 may provide any of a variety of data and/or functionality to computing devices 105, 110, 115, and 120. The data may be publicly available or alternatively restricted, e.g., restricted to only certain users or available only if the appropriate fee is paid, etc.

Server device 125 is at least one of a network server and an application server, or may be a combination of both. Server device 125 is any device that is the source of content, and client devices 105, 110, 115, and 120 include any devices that receive such content. Therefore, in a peer-to-peer network, the device that is the source of the content is referred to as the server device while the device that receives the content may be referred to as the client device. Both types of devices are able to load and run software applications, including operating systems and applications, in accordance with the example embodiments described herein.

At data source 130 or 135, software programs, including operating systems and applications, are prepared for and/or provided to any one of server device 125 or client devices 105, 110, 115, and 120 for execution. For the sake of consistency, the discussion hereafter refers to "applications" which encompass anyone of, at least, operating systems, programs, and applications, as known in the art, either singularly or in combination. Furthermore, the applications are disseminated to server device 125 either off-line, as from data source 130 or on-line, as from data source 135. Further still, the applications are typically disseminated to client devices 105, 110, 115, and 120 on-line from server device 125 or from data source 135. Means and methods for off-line dissemination thereof are known as well.

Figure 2:
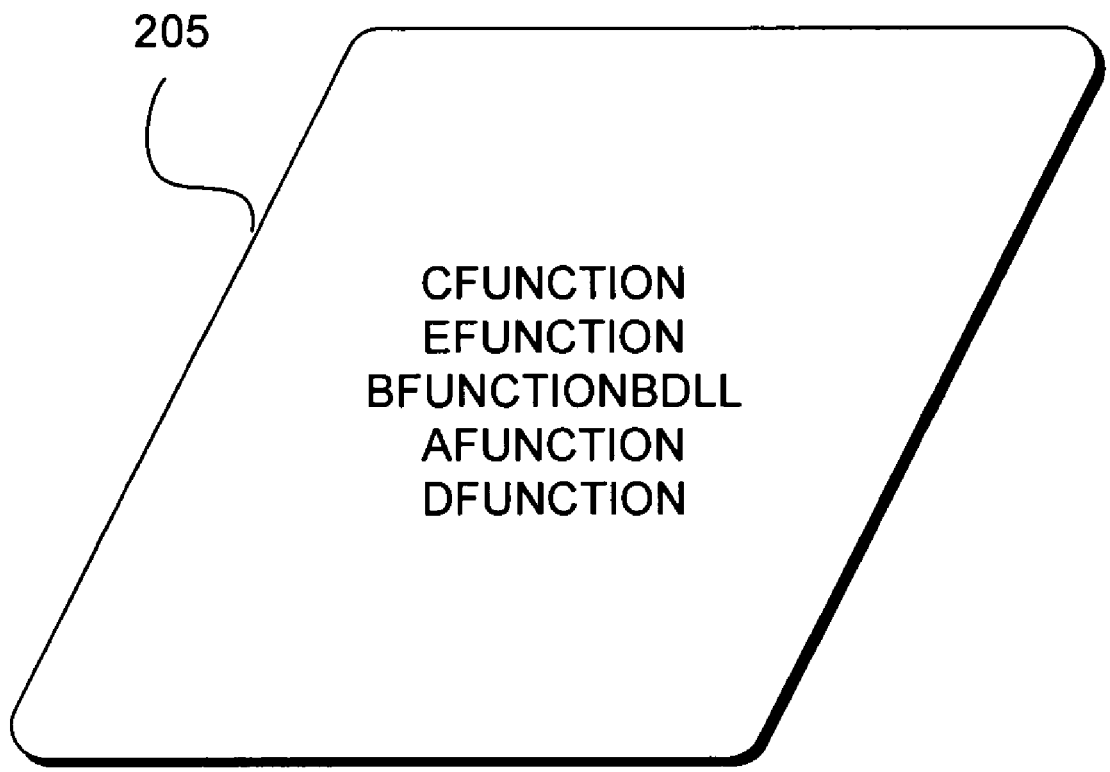
FIG. 2 shows an example of an executable import table in accordance with an example embodiment.

Applications and programs are written in an executable code (hereafter "executable") in order to be executed by server device 125 or any one of client devices 105, 110, 115, and 120. An executable contains one or more code component containers which perform various functions. An executable can make use of specific functionalities of another executable by loading the second executable into its virtual address space. This loading process is called "dynamic linking." To facilitate dynamic linking, the executable which will be dynamically linked should provide an "export table" which details the entry points into its executable code components by which another executable can call. An executable possessing such features is typically called a "dynamically-linked library" or a DLL for short. A DLL can be used to perform one or more functions at runtime for another executable. To automate the dynamic linking of DLLs, an executable can contain one or more "import tables," which may be regarded as a linker table describing specific linkages to other DLLs. As an example, FIG. 2 shows import table 205 of an executable, which includes hypothetical DLLs, "CFUNCTION," "EFUNCTION," "BFUNCTION," "AFUNCTION," and "DFUNCTION" and executable name "BDLL."

The following description includes references to memory stacks and memory heaps. Memory stacks refer to portions of memory that hold local data for particular functions corresponding to respective DLLs, and memory heaps refer to portions of memory shared by more than one executable corresponding to a respective application. That is, stacks are local whereas heaps are global.

According to example embodiments described herein, code execution is disabled on particular data/stacks pages, which are segments of an application that have been transferred into memory, thus eliminating the potential for invalid code that is injected into the heap or onto the stack from being executed. In other example embodiments, the layout of valid import tables, including executables and their respective DLLs, is randomized to prevent attacks from utilizing valid code existing in an application.

In a first example embodiment for disabling code execution on data/stack pages, code pages are separated from data and stack pages. Current operating systems (hereafter "OS") including, e.g., Microsoft® Windows® operating systems (Windows® XP®, 2000®, and future versions thereof), code segments, data segments, and stack segments are all set to a same range covering an entire 32-bit address space. In this first embodiment, a special intrusion-resistant execution mode (IREX) is added to the OS to protect certain security-sensitive applications.

Figure 3:
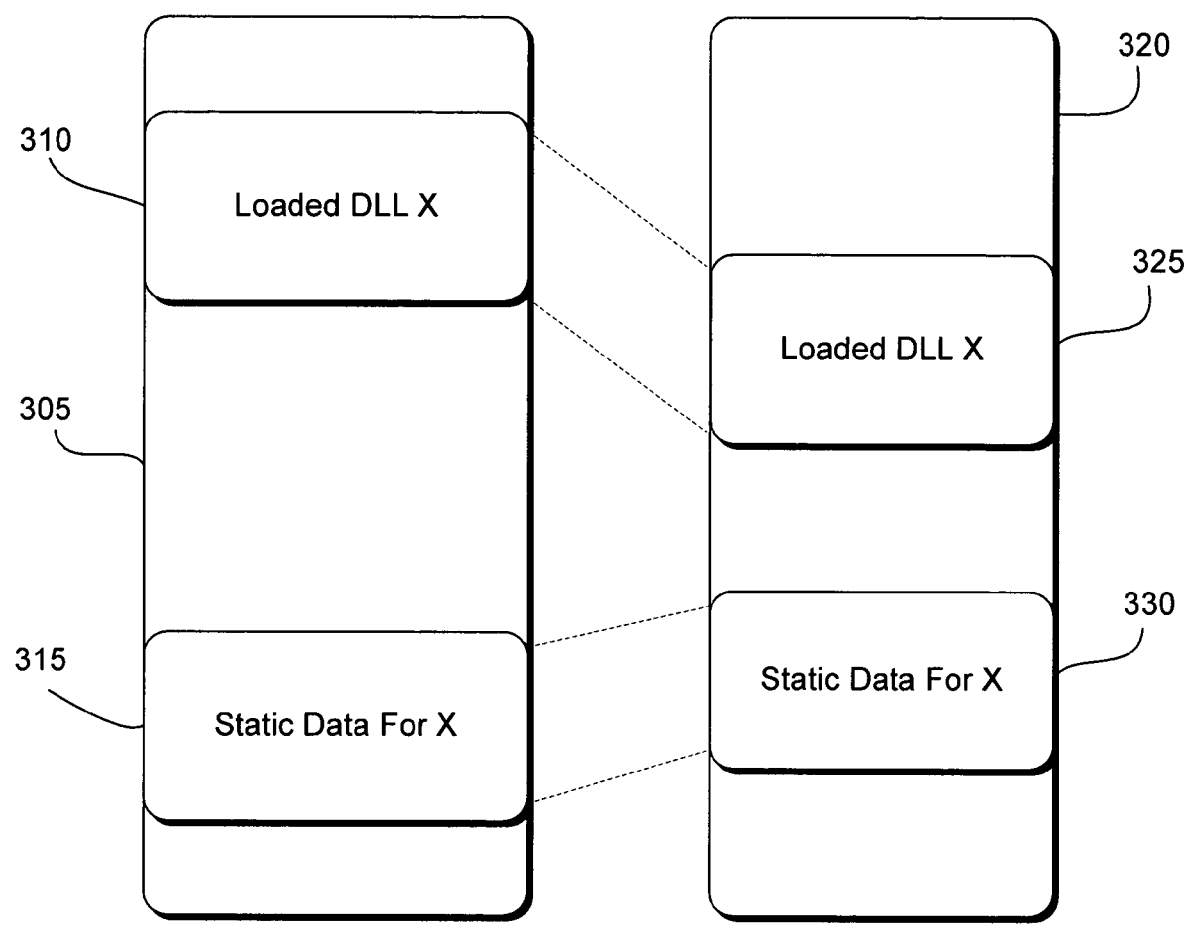
FIG. 3 shows a memory layout according to an example embodiment.

FIG. 3 shows an example memory layout of an IREX application for a first user address space 305 and a second user address space 320. In both user spaces, an application loading module may dispose respective user code segments 310 and 325 at any position in respective user address spaces 305 and 320. Further, the application loading module may utilize the entire user address space to position the respective stack segments containing user data 315 and 330. Thus, FIG. 3 shows that, in accordance with an example embodiment, the same code segment, including a DLL or static data, may be located at different address locations in different address spaces. As a result, by rendering the virtual code pages respectively corresponding to user address spaces 305 and 320 to be "read-only executable" pages, a buffer-overrun attempt is unable to modify the code segment. For example, for an AMD® 64-bit architecture, an Intel® 64-bit architecture, or a 32-bit X86 architecture with Physical Address Extension (PAE), instead of producing a special code segment, it is sufficient to mark data and stack virtual pages as being "non-executable," and marking the code pages as being "executable" and "read-only."

In accordance with the example embodiment of FIG. 3, a host OS rearranges the layout of executable code in the user code segment upon application installation and/or its runtime initialization. Therefore, it is difficult for an attacker (hereafter "hacker") to determine the exact locations of particular instructions in the application, hence defeating hacking efforts that attempt to make use of a known instruction sequence in the application itself to execute using invalid data that has been injected into the application. The layout rearrangement produces a functionally equivalent version of the program and can be performed on any of server device 125 or client devices 105, 110, 115, and 120 (see FIG. 1).

Figure 4:
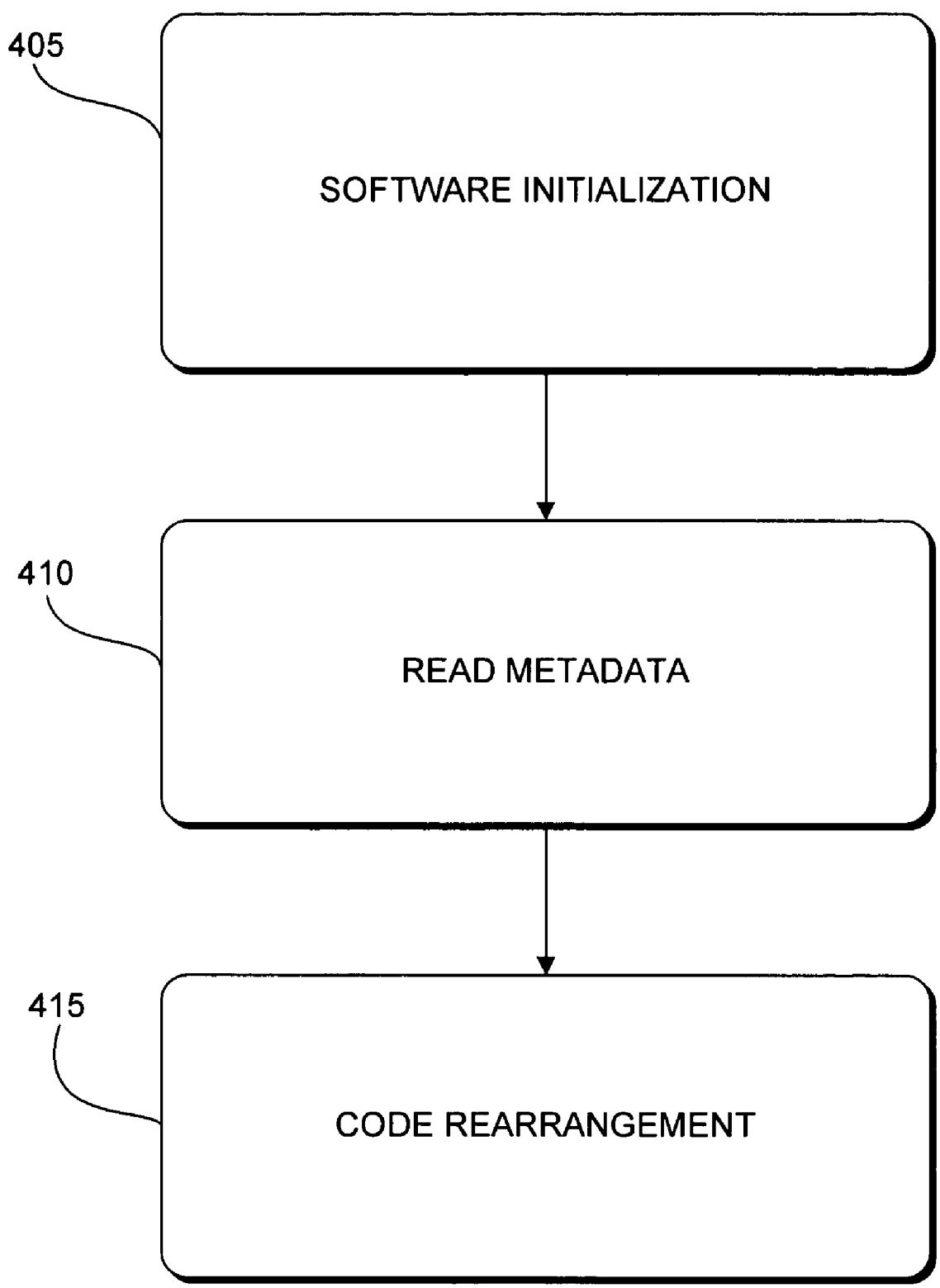
FIG. 4 shows the processing in accordance with an example embodiment.

Thus, FIG. 3, above, refers to a first form of program individualism, referred to as "block rearrangement." The processing for block rearrangement, in accordance with the example of FIG. 3, is shown in FIG. 4. The process implemented during the installation begins with initialization 405, which includes an inventorying process. The inventorying includes reading 410 metadata identifying, at least, DLLs to be loaded during execution as well as data regarding the size of code segments corresponding to the application including import tables and other code segments. That is, the metadata provides threshold information regarding the block layout in the application. The metadata may be incorporated in the OS and/or application, or the metadata may accompany the OS and/or application in another format known in the art. The code rearrangement 415 randomizes the location of code-containing segments in a memory utilizing a random generator that generates a random value within the appropriate address space. That is, as an example, at least one of the import tables corresponding to the application is disposed at a random location within the memory space for the application upon the loading of the application.

Further to such implementation, the DLLs specified by an import table may be randomly rearranged, either in combination with the block rearrangement described above or as an individual security measure. In such implementation, code rearrangement 415 further includes randomly rearranging the hypothetical DLLs, "CFUNCTION," "EFUNCTION," "BFUNCTION," "BDLL," "AFUNCTION," and "DFUNCTION" in the example import table of FIG. 2. To re-arrange basic function blocks (or DLLs) in an application, the blocks are to be identified, rearranged, and the addresses of the rearranged blocks, or code component containers, need to be updated.

The block rearrangement may be implemented in either an application-specific manner or a system-wide manner, during the installation of at least one of the OS and application. That is, an extra layer of security may be gained by implementing block rearrangement, first, when loading an OS and, secondly, when loading the application. However, in order for the same executable or DLL image to be shared among multiple processes, the block-rearrangement operation should be performed only once on each client device or server device. Still, the implementation may be re-applied after a system (or application) shutdown at a periodic interval to increase the protection strength.

The foregoing example embodiment for block rearrangement may further randomize executables and corresponding DLLs of an application by loading them into random locations, in accordance with different spatial orders in a code segment. Code segments may also be referred to as code containers, and are intended to store code components, which include, e.g., executables and their corresponding DLLs. The initial temporal order in which the executables and corresponding DLLs are loaded is preserved, however. The same DLL should be mapped into the same page offset across different processes. The offset need not be zero, as long as it is cache-aligned.

To further reduce any likelihood that a hacker is able to correctly guess the starting location of a particular DLL, a code segment is allocable to any portion of an address space corresponding to the IREX process. For example, on a 32-bit server device or client device with a 2 GB user address space, the code segment may be allocated to the first GB of virtual space. Thus, if the code segment is 100 MB and the DLLs are mapped at a cache-line alignment (32 bytes), there are approximately 30,277,632 possible locations a specific instruction can be at.

Since a particular DLL may be loaded at different cache-aligned virtual addresses in different IREX processes, consideration is given to the fact that any reduction in consumption of physical memory requires a DLL to be shared. That is, code in a DLL may require access to static data that is also allocated during the load process. Therefore, according to an example embodiment, memory references to the static data section are made using absolute addressing and fixed up during the DLL loading process. Sharing an IREX DLL across multiple processes require that its static data section be at the same relative distance to the DLL code in all these processes.

The example embodiment further includes at least two sample solutions for avoiding collisions between static data corresponding to a DLL and a heap page that has already been allocated. First, if an IREX loader chooses from a large virtual address space, e.g., 1 GB, to allocate a code segment, the IREX loader can pick a range of virtual addresses to map the code segment such that virtual addresses for mapping the static data sections corresponding to a DLL are all available. Second, access to the static data section can be done via indirection. That is, the loader may allocate a read-only region at a known location, for example, page 0, for storing virtual addresses of each static data section corresponding to a DLL. Within each DLL, instead of directly accessing a location in the static section, a read is first made to fetch the actual location of the static section, and then the access is made via an offset into the data section. This location can be loaded into a free code segment at the beginning of a function if such code segment is available. In order for the same DLL to be mapped at different virtual addresses across multiple processes, the addressing within a DLL must be relative.

According to another example embodiment, load-time re-ordering shuffles the memory locations at which the import table including executable and corresponding DLLs is loaded. Such randomized loading is implemented upon each loading operation at a respective server or client device. This implementation results in unpredictable locations for any function sequences that a hacker wishes to exploit. The operation is inexpensive in that the loader merely determines where to load each executable and respectively corresponding DLL, and is performed independently for every IREX process.

More specifically, when an IREX application is shipped to any one of server device 125 or client devices 105, 110, 115, and 120 (see FIG. 1), it comes with, either inclusively or as an attachment, corresponding IREX metadata. The metadata identifies, at least, all possible DLLs to be loaded during execution as well as data regarding the size of the code segment. The IREX metadata is packaged along with the application and is signed by the application vendor.

Figure 5:
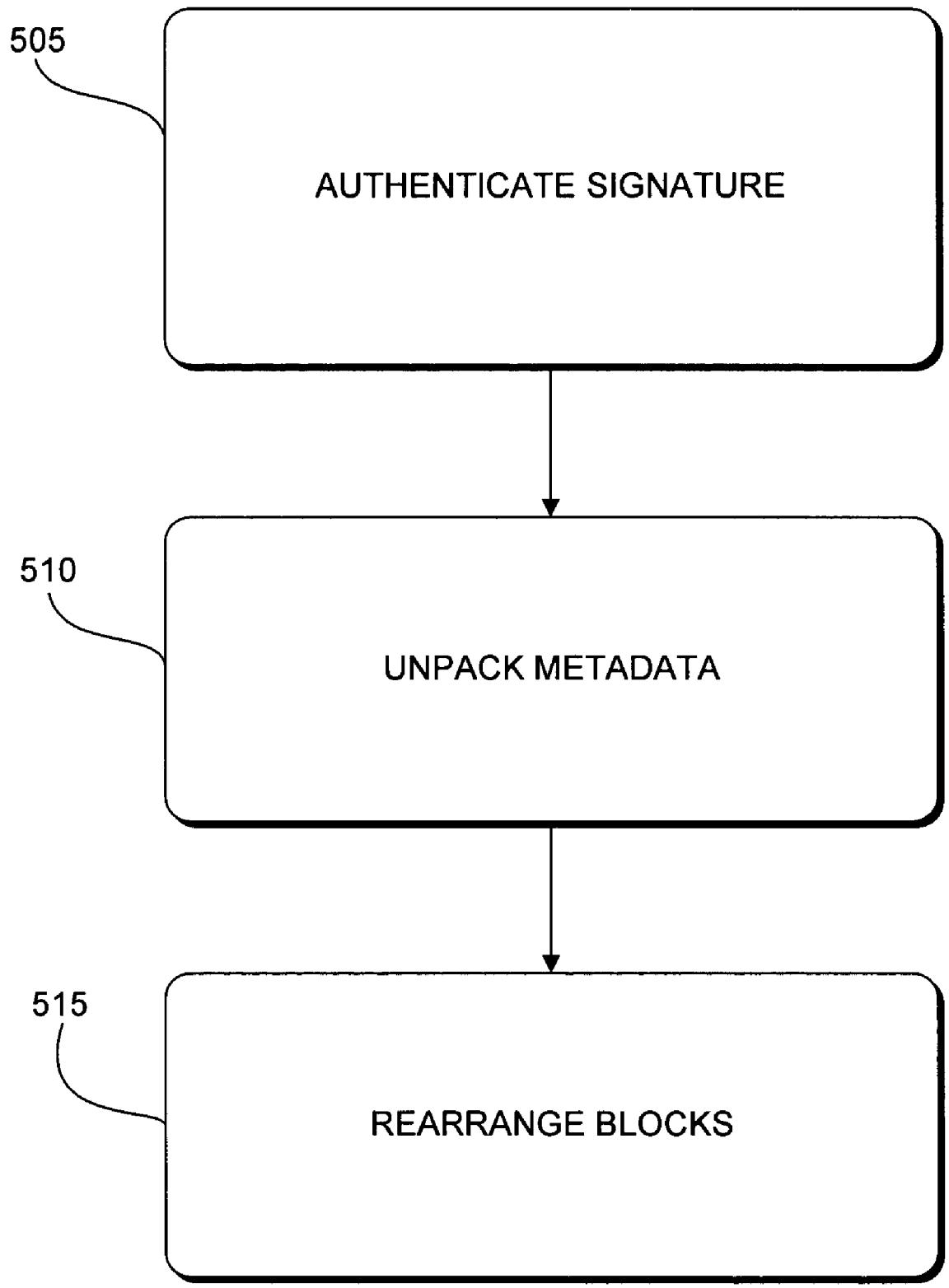
FIG. 5 shows the processing in accordance with another example embodiment.

During the installation, as shown in FIG. 5, the modified OS installer authenticates 505 the IREX signature using protocol known in the art, unpacks 510 the IREX metadata, and rearranges the blocks 515. Such rearrangement may be made in accordance with instructions included in the metadata. The metadata is then stored in an internal database of the OS installer in the appropriate one of server device 125 or client device 105, 110, 115 and 120 for further use by the (modified) OS loader.

As set forth above regarding the example embodiment of FIG. 4, alternative embodiments may relocate only the DLLs at random addresses and still achieve desirable measures of intrusion resistance. Thus, the block rearrangement implementation exemplified by FIG. 5 provides an increased measure of intrusion resistance beyond that of randomizing the location of just the DLLs.

Alternate embodiments to the examples of both FIGS. 4 and 5 include performing the block relocation described above prior to distribution of individualized copies of operating systems or applications. Such embodiment provides an extra level of security protection to an application vendor that is concerned about shipping block information that may aid hackers in reverse-engineering the code.

Figure 6:
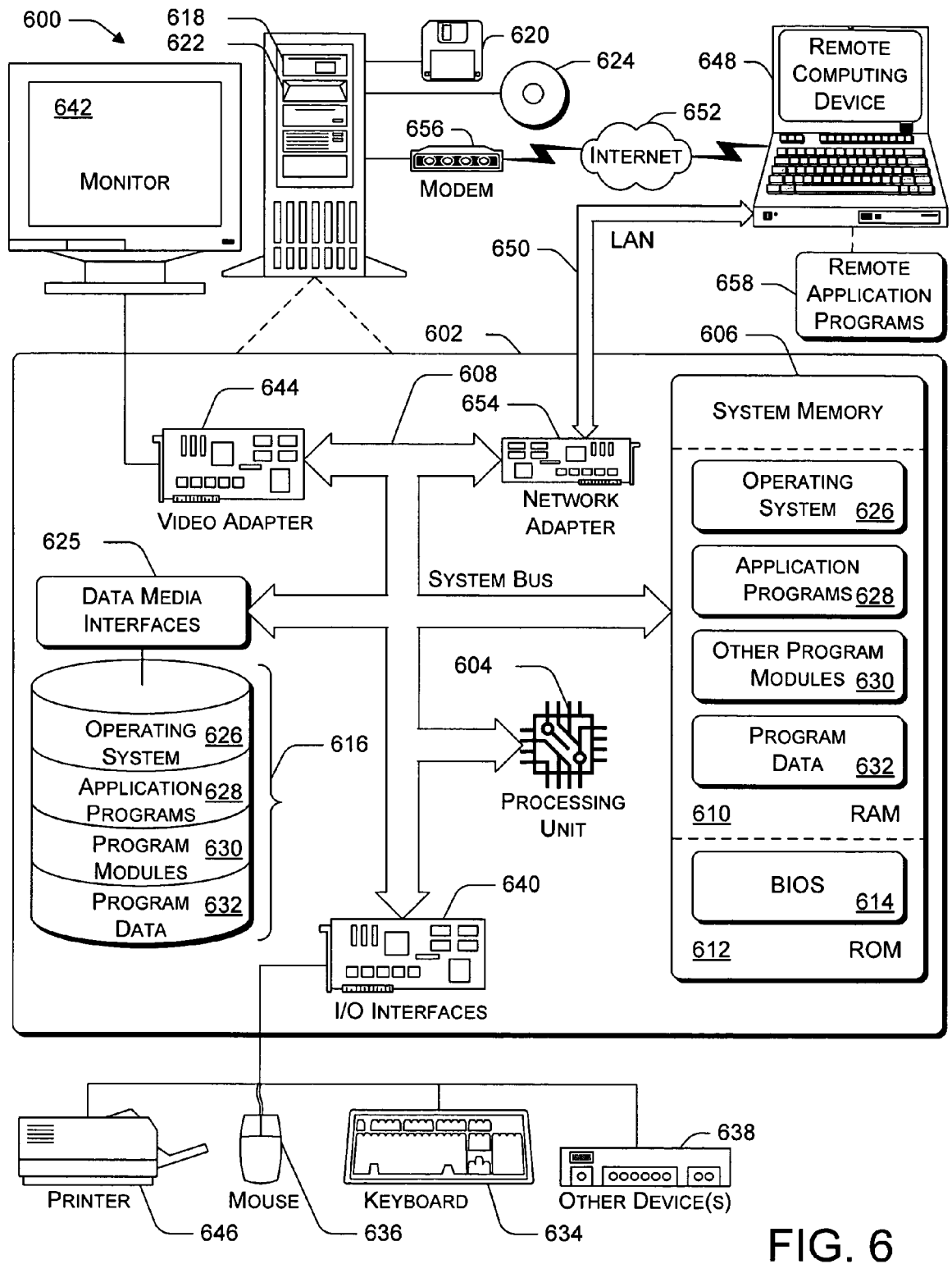
FIG. 6 illustrates a general computer network environment which can be used to implement the techniques described herein.

FIG. 6 illustrates a general computer environment 600, which can be used to implement the techniques described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

Computer environment 600 includes a general-purpose computing device in the form of a computer 602. The components of computer 602 can include, but are not limited to, one or more processors or processing units 604, system memory 606, and system bus 608 that couples various system components including processor 604 to system memory 606.

System bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 602 may include a variety of computer readable media. Such media can be any available media that is accessible by computer 602 and includes both volatile and non-volatile media, removable and non-removable media.

System memory 606 includes computer readable media in the form of volatile memory, such as random access memory (RAM) 610; and/or non-volatile memory, such as read only memory (ROM) 612 or flash RAM. Basic input/output system (BIOS) 614, containing the basic routines that help to transfer information between elements within computer 602, such as during start-up, is stored in ROM 612 or flash RAM. RAM 610 typically contains data and/or program modules that are immediately accessible to and/or presently operated on by processing unit 604.

Computer 602 may also include other removable/non-removable, volatile/non-volatile computer storage media. By way of example, FIG. 6 illustrates hard disk drive 616 for reading from and writing to a non-removable, non-volatile magnetic media (not shown), magnetic disk drive 618 for reading from and writing to removable, non-volatile magnetic disk 620 (e.g., a "floppy disk"), and optical disk drive 622 for reading from and/or writing to a removable, non-volatile optical disk 624 such as a CD-ROM, DVD-ROM, or other optical media. Hard disk drive 616, magnetic disk drive 618, and optical disk drive 622 are each connected to system bus 608 by one or more data media interfaces 625. Alternatively, hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, removable magnetic disk 620, and removable optical disk 624, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 616, magnetic disk 620, optical disk 624, ROM 612, and/or RAM 610, including by way of example, operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as keyboard 634 and a pointing device 636 (e.g., a "mouse"). Other input devices 638 (not shown specifically) may include a microphone, joystick, game pad, satellite dish, serial port, scanner, and/or the like. These and other input devices are connected to processing unit 604 via input/output interfaces 640 that are coupled to system bus 608, but may be connected by other interface and bus structures, such as a parallel port, game port, or a universal serial bus (USB).

Monitor 642 or other type of display device can also be connected to the system bus 608 via an interface, such as video adapter 644. In addition to monitor 642, other output peripheral devices can include components such as speakers (not shown) and printer 646 which can be connected to computer 602 via I/O interfaces 640.

Computer 602 can operate in a networked environment using logical connections to one or more remote computers, such as remote computing device 648. By way of example, remote computing device 648 can be a PC, portable computer, a server, a router, a network computer, a peer device or other common network node, and the like. Remote computing device 648 is illustrated as a portable computer that can include many or all of the elements and features described herein relative to computer 602. Alternatively, computer 602 can operate in a non-networked environment as well.

Logical connections between computer 602 and remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, computer 602 is connected to local network 650 via network interface or adapter 654. When implemented in a WAN networking environment, computer 602 typically includes modem 656 or other means for establishing communications over wide network 652. Modem 656, which can be internal or external to computer 602, can be connected to system bus 608 via I/O interfaces 640 or other appropriate mechanisms. It is to be appreciated that the illustrated network connections are examples and that other means of establishing at least one communication link between computers 602 and 648 can be employed.

In a networked environment, such as that illustrated with computing environment 600, program modules depicted relative to computer 602, or portions thereof, may be stored in a remote memory storage device. By way of example, remote application programs 658 reside on a memory device of remote computer 648. For purposes of illustration, applications or programs and other executable program components such as the operating system are illustrated herein as discrete blocks, although it is recognized that such programs and components reside at various times in different storage components of computing device 602, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A method of securing an application for execution at a computing device having one or more processors and memory communicatively coupled to the one or more processors, the method comprising:
    defining, in the memory of the computing device, code segments configured to store one or more code components for the application, the one or more code components comprising executables of the application and corresponding dynamically-linked libraries (DLLs) of the application, wherein the code segments are defined by reading metadata identifying the one or more components and data regarding the size of the code segments including import tables describing specific linkages to the DLLs of the application;
    disposing the one or more code components in the code segments; and
    randomizing, via the computing device, addresses of the code segments in the memory to prevent attacks from utilizing valid code existing in the application, wherein the layout of the import tables is randomly rearranged within the memory for the application upon loading of the application based on the metadata.

2. A method according to claim 1, wherein the code segments are contiguous regions of the memory.

3. A method according to claim 2, wherein the code segments store segments of the one or more code components.

4. A method according to claim 1, further comprising randomizing an order of the one or more code components in at least one of the respective code segments.

5. A method according to claim 1, further comprising identifying the code segments that store the one or more code components.

6. A method according to claim 1, wherein the code segments are executable.

7. A method according to claim 6, wherein the one or more code components for the application that are not disposed in one of the code segments are non-executable.

8. A method according to claim 1, wherein a virtual page having one or more of the code segments stored therein is executable.

9. A method according to claim 8, wherein a virtual page without one of the code segments is non-executable.

10. A method of loading an application for execution at a computing device, the method being implemented at the computing device and comprising:
    retrieving, from the application, metadata regarding components of the application for execution at the computing device, the metadata identifying:
        the components to be loaded during the execution of the application, the components comprising all of executables and dynamically linked libraries (DLLs); and
        data indicative of size of a code segment within memory of the computing device, the code segment being configured to store the components;
    disposing the components in the code sequent including import tables describing specific linkages to the DLLs of the application;
    loading, based on the retrieved metadata, the components into random locations in accordance with a random spatial order in the code segment; and
    preserving the locations of the components within the code segment.

11. A method according to claim 10, wherein the random locations include virtual pages.

12. A method according to claim 10, wherein the components include at least one import table containing an executable and at least one corresponding dynamic link library (DLL) of the executables and DLLs.

13. A method according to claim 12, further comprising identifying components containing the executable and the at least one corresponding DLL.

14. A method according to claim 12, further comprising randomizing locations of the executable and the at least one corresponding DLL within the at least one import table.

15. One or more computer storage media having one or more instructions for securing a software application, the one or more instructions, when executed at a computing device having one or more processors, configuring the one or more processors to perform a method, the method comprising:
    retrieving metadata for an application, the metadata identifying:
        components to be loaded during execution of the application, the components comprising all of executable and dynamically linked libraries (DLLs) of the application; and
        data indicative of size of code blocks in memory of the computing device, the code blocks including import tables describing specific linkages to the DLLs of the application;
    inventorying the code blocks in the memory of the computing device for the application based on the metadata, the code blocks being configured to store the components of the application;
    disposing the components in the code blocks; and
    placing randomly the code blocks in the memory of the computing device for the application, wherein the layout of the import tables is randomly rearranged within the memory for the application upon loading of the application based on the metadata.

16. One or more computer storage media according to claim 15, wherein the method further comprises inventorying the randomly placed blocks.

17. One or more computer storage media according to claim 15, wherein the code blocks contain at least one of an executable and a DLL.

18. One or more computer storage media according to claim 15, wherein the code blocks contain at least one linker table.

19. One or more computer storage media according to claim 15, wherein the method further comprises randomizing an order of components of the application within at least one of the code blocks.

20. One or more computer storage media according to claim 15, wherein the method further comprises randomly placing the code blocks within the memory of the computing device upon every initialization of the application.

21. One or more computer storage media according to claim 15, wherein the randomly placed code blocks include only code blocks containing executable code, as identified by the metadata.

22. One or more computer storage media having one or more instructions for securing a software application, the one or more instructions, when executed at a computing device having one or more processors, configuring the one or more processors to perform a method, the method comprising:
- retrieving metadata for an application, the metadata identifying:
  - components to be loaded during execution of the application, the components comprising all of executable and dynamically linked libraries (DLLs) of the application; and
  - data indicative of size of code blocks in memory of the computing device, the code blocks including import tables describing specific linkages to the DLLs of the application;
- inventorying the code blocks including the import tables for the application based on the metadata, the code blocks being configured to store the components of the application;
- disposing the components in the code blocks; and
- randomizing relative positions of the linked DLLs of the application in at least one of the import tables upon loading of the application based on the metadata.

23. An application security system, comprising:
one or more processors;
memory coupled to the processor; and
computer-executable instructions stored thereon in the memory, the computer-executable instructions, when executed by the application security system, directing the one or more processors to secure a software application, the computer-executable instructions comprising:
- means for inventorying one or more code components for an application;
- means for defining code segments in the memory of the application security system for at least one of the one or more code components for the application, the one or more code components comprising executables of the application and corresponding dynamically-linked libraries (DLLs) of the application, wherein the code segments are defined based on metadata obtained from the inventorying, the metadata identifying the one or more code components and data regarding the size of the code segments including import tables describing specific linkages to the DLLs of the application;
- means for placing the one or more code components in the code segments; and
- means for randomizing locations of the code segments within the memory of the application security system, wherein the layout of the import tables is randomly rearranged within the memory for the application upon loading of the application based on the metadata.

24. An application security system comprising:
one or more processors;
memory coupled to the processor; and
computer-executable instructions stored on the memory, the computer-executable instructions, when executed by the application security system, directing the one or more processors to secure a software application, the computer-executable instructions comprising:
- means for initializing an application for execution at the application security system;
- means for retrieving metadata for components of the application, the metadata identifying:
  - the components to be loaded during execution of the application, the components comprising executables and corresponding dynamically linked libraries (DLLs) of the application; and
  - data indicative of size of a code block within memory of the application security system, the code block being configured to store the components;
- means for storing the components in random locations in the code block including import tables describing specific linkages to the DLLs of the application within the memory of the application security system; and
- means for loading, based on the retrieved metadata, the components into the random locations in accordance with a random spatial order in the code block.

\* \* \* \* \*